March 14, 1950  R. H. VOGEL  2,500,502
MASTER CYLINDER
Filed Jan. 12, 1946
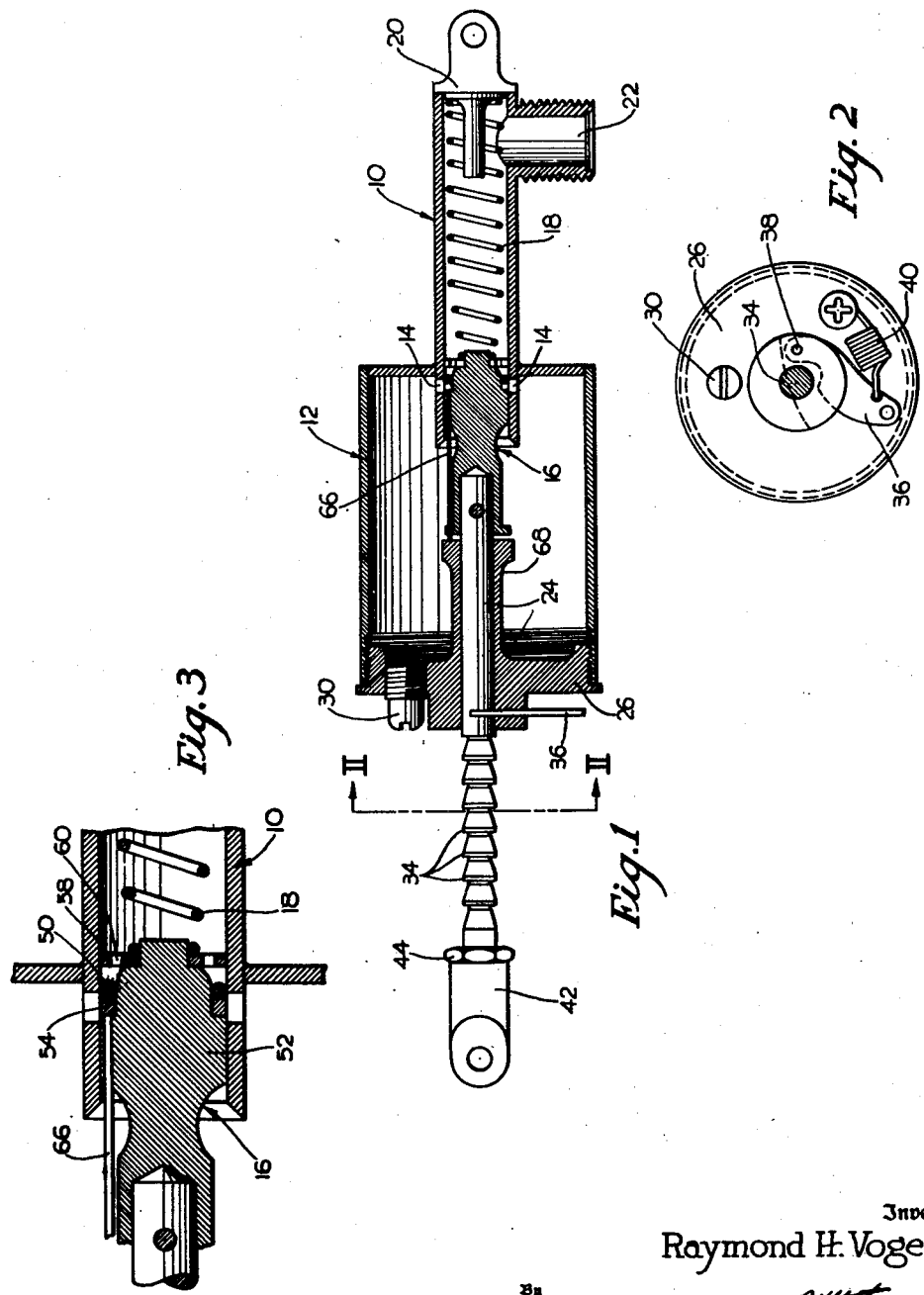
Inventor
Raymond H. Vogel Patented Mar. 14, 1950

2,500,502

UNITED STATES PATENT OFFICE 2,500,502

MASTER CYLINDER

Raymond H. Vogel, Akron, Ohio, assignor to Wingfoot Corporation, Akron, Ohio, a corporation of Delaware Application January 12, 1946, Serial No. 640,944

6 Claims. (Cl. 60—54.6)

This invention relates to packing combinations, and, more particularly, to piston and cylinder packings for use with master brake cylinders, and the like. Heretofore, in master brake cylinders, for example, various types of packings have been proposed for use between the piston and cylinder to effect an adequate seal there-between. Many of the packings employed have been double acting, namely, to effect a seal both on the pressure stroke and the return stroke of the piston in the cylinder. This has necessitated, in many instances, the inclusion of a valve in the piston which has been adapted to open upon the return stroke of the piston, or to be forced to an open position by a stationary pin, or the like, contacting the valve upon the final stage of movement of the return stroke of the piston. Such a valve has been a constant source of trouble, in many instances, and has always added another item of cost to the manufacture of the master cylinder. Various efforts have been made to eliminate the valve piston by employing a packing sealing in only one direction, specifically upon the pressure stroke of the piston. Such packings have taken the form of the usual suction cup having a lip portion contacting the cylinder wall, but these lip-type packings in which the lips are forced down into contact with the cylinder wall by the pressure inside the cylinder are very subject to wear, especially at heavy working pressures, and these packings have necessitated constant attention, maintenance, and replacement.

It is the general object of my invention to avoid and overcome the foregoing and other difficulties of and objections to prior known devices of the character indicated, by the provision of a relatively simple, inexpensive, and satisfactory and long lived packing for use in a master brake cylinder, or the like, and in which the packing functions to effect a seal in only one direction of relative movement between the parts to be sealed by the packing.

Another object of my invention is to provide an improved packing combination for use in a master cylinder wherein the packing functions to effect a positive seal during the pressure stroke of the piston, but moves to a non-sealing position upon the return stroke of the piston.

Another object of my invention is the provision of a master cylinder including packing means of inexpensive, practical character which will permit the master cylinder to be "pumped" to effect a braking pressure regardless of small leaks in the braking system.

Another object of my invention is to provide a one-way packing for use between a piston and a cylinder, the packing including an O-ring of resilient material which ring is carried by a cylindrical surface on the piston and in engagement with a radial shoulder on the piston and in engagement with the inner wall of the cylinder during the pressure stroke of the piston, but which O-ring rolls to a non-sealing position upon the return stroke of the piston.

Another object of my invention is the provision of an improved master cylinder-packing combination.

The foregoing objects of my invention, and other objects which will become apparent as the description proceeds, are achieved by the provision in combination with a pair of relatively movable members of a substantially round cross-section packing ring, a support on one of the members for the packing ring so that in relative movement between the members in one direction the packing ring seals between the members, and upon relative movement of the members in the opposite direction the ring moves to a position off the support to allow fluid to pass between the members.

For a better understanding of my invention, reference should be had to the accompanying drawing wherein Fig. 1 is a longitudinal cross-sectional view of a master brake cylinder incorporating the principles of my invention; Fig. 2 is a transverse cross-sectional view of the master cylinder of Fig. 1, and taken on line II—II thereof; and Fig. 3 is an enlarged cross-sectional view similar to Fig. 1, but taken of only the packing combination portion of Fig. 1.

In the drawing, the numeral 10 indicates generally a working cylinder which opens into, and which is connected in axial alignment with a storage cylinder indicated generally by the numeral 12. It will be understood that the two cylinders are joined together in fluid tight relation, and as seen from Fig. 1, the working cylinder 10 is generally made to extend for a short distance into the storage cylinder 12, and with lateral openings 14 being provided in the working cylinder which are in communication with the inside of the storage cylinder 12.

A piston, indicated generally by the numeral 16, is slidably received in the working cylinder 10, and the piston 16 is normally urged to the retracted or storage cylinder end of the working cylinder by spring means, such as the coiled compression spring 18 carried between the piston 16 and a closure plug 20 on the end of the working cylinder 10. A lateral nipple opening 22 is provided at the end of the working cylinder adjacent to plug 20. The piston 16 is secured to a piston rod 24 slidably received in a closure cap 26 threaded into the end of the storage cylinder 12 remote from the working cylinder 10. It should be noted that the master cylinder assembly shown in Fig. 1 is ordinarily employed with the working cylinder 10 extending downwardly and with the storage cylinder 12 being positioned vertically above it, and in this operative position of the master cylinder no packing is required between the piston rod 24 and the closure cap 26. If, however, the master cylinder is to be used in a horizontal position, it is necessary to employ a suitable packing between the piston rod 24 and the closure cap 26. A screw plug 30 in the cap 26 permits the storage cylinder 12 to be refilled with braking fluid as often as required.

In order to lock the piston 16 in any desired position in the working cylinder 10, the piston rod 24 is provided with a plurality of abutments or shoulders 34, any particular abutment being adapted to be engaged by a locking plate 36, pivoted as at 38 in a slot in the closure cap 26, with the locking plate 36 being normally held in non-locking position by a tension spring 40, all as best seen in Fig. 2. A clevis 42 is adjustably threaded onto the end of the piston rod 24, and is held in adjusted position by a lock nut 44.

Turning now to the packing combination of my invention, and having reference to Fig. 3, I employ an O-ring of commercially available character, and made from resilient material, such as rubber, these rings being relatively tough and long wearing, inexpensive, and adapted to be easily installed in position. During the pressure stroke of the piston 16 in the working cylinder 10, which stroke is from left to right of both Figs. 1 and 3 in the drawings, the O-ring 50 is adapted to seal between the piston and the cylinder wall. This I achieve by providing a continuously cylindrical surface on the piston which is conveniently provided by forming the piston 16 with a boss 52 of reduced diameter at the working end of the piston, the boss being in axial alignment with the piston. The size of the O-ring 50 with respect to the cylindrical surface of the boss 52 and the internal diameter of the working cylinder 10 is such that the O-ring is compressed radially to positively engage with the boss of the piston and the inner surface of the working cylinder. The O-ring is held against displacement in a lateral direction by engagement with a radially extending shoulder, which is formed by the end of the piston adjacent the cylindrical surface of the boss 52. In the form of the invention shown in Fig. 3, the radial shoulder on the piston is not provided by the piston itself, but is provided by a metal ring of substantially square cross-section, and indicated by the numeral 54, which engages with the end of the piston and with the side of the O-ring 50, and which is slidably received on the cylindrical surface of the boss 52. The ring 54 is adapted to positively dislodge the O-ring 50 from sealing position between the piston and working cylinder 10, in a manner which will be hereinafter described.

During the return stroke of the piston 16, the O-ring 50 rolls to a position wherein the O-ring does not seal between the piston and working cylinder. Although this non-sealing relationship can be achieved by providing axially extending grooves near the end of the boss 52 remote from the piston 16, or in other ways, it is conveniently achieved in the embodiment of the invention illustrated by forming the boss 52 with an end of reduced diameter, the diameter being reduced on a gradually curved line in the manner shown. Thus, it will be recognized that when the piston 16 moves to the left of the working cylinder 10 that the O-ring 50 will roll to a position where it no longer engages with the boss 52 of the piston so that braking fluid can pass between the O-ring 50 and the boss 52 of the piston.

I preferably provide means for holding the O-ring 50 against movement entirely off of the piston 16, and this may be achieved by employing a washer 58 which is secured onto the end of the boss 52, in the manner illustrated, with the washer 58 having a plurality of circumferentially spaced perforations or holes 60 through which braking fluid can readily pass. As noted in Fig. 3, the washer 58 may be held in place on the boss 52 by the compression spring 18, although preferably the washer 58 is welded or otherwise secured to the boss 52 in permanent fashion.

If, for some reason, such as heavy return pressure in the working cylinder 10, the O-ring 50 does not roll to the reduced diameter portion of the boss 52 upon the return stroke of the piston 16, means are provided to positively dislodge the O-ring 50 from its seat on the cylindrical surface of the boss 52. This is achieved by providing a small push-rod 66 which is carried by the piston 16, and which is adapted to engage with the end of an extension 68 formed on the closure cap 26 when the piston 16 is near the end of its return stroke. When the rod 66 engages with the end of the extension 68 on the closure cap, the rod slides through the piston to engage the metal ring 54 and force it and the O-ring 50 to the right of the piston 16 upon the continued backward movement of the piston 16. Accordingly, when the piston has completed its return stroke the O-ring 50 is always in a non-sealing relation with the piston.

From the foregoing, it will be recognized that the various objects of my invention have been achieved by the provision of a relatively inexpensive, practical, long-lived master cylinder-packing combination employing conventional packing parts, and permitting "pumping-up" the brake pressure in case of a slow leak in one of the brake lines or operating cylinders. For example, with the master cylinder operating in a vertical position, the piston 16 is moved into the working cylinder by the brake pedal in known fashion to apply the desired fluid pressure into the braking system. During this pressure stroke of the piston, the O-ring 50 is in sealing relation between the piston and the working cylinder. Should there be a leak in the braking system so that the piston 16 will go clear to the end of the working cylinder 10, the brake operator will quickly release the pressure on the brake pedal, the compression spring 18 will return the piston 16 at which time the seal ring 50 moves into non-sealing relationship with the piston to allow a fresh charge of fluid into the working cylinder even though the piston 16 has not returned to the end of its return position. Another quick application of the brake pedal will cause the O-ring 50 to move back in sealing relation with the piston so that pressure can again be applied to the braking system. A rapid repetition of this performance is called "pumping-up" the master cylinder and will give a continuous supply of fluid under pressure to the braking system which may be highly important in an emergency stop where the braking system has sprung a leak. Of course, when the piston 16 is fully returned and in a normal braking operation without "pumping-up" the O-ring 50 moves to non-sealing relation with the piston to also allow fluid to flow from the storage cylinder 12 into the working cylinder 10. Should the O-ring not move to non-sealing position, for some reason as noted above, the rod 66 will act to positively unseat the O-ring in a manner heretofore described.

It is a relatively simple matter to replace the O-ring 50 should it become worn from excessive operation of the assembly, in which case the closure cap 26 is removed from the storage cylinder 12 and the piston rod and piston together with the closure cap are pulled out of the storage cylinder. Then the old O-ring is dropped down at one side in the "well" provided between the reduced end of the boss 52 and the washer 58, and the diametrically opposite portion of the O-ring is readily worked over the washer and the O-ring is removed in much the same manner that an inextensible tire bead is removed from an endless drop center rim. A new O-ring is inserted in position by a reversal of the operation. It is also possible to slightly stretch the O-ring to get it on or off of position so that a true drop center or "well" action is not required.

While in accord with the patent statutes, one specific embodiment of my invention has been illustrated and described in detail, it should be understood that I am not to be limited thereto or thereby but that the scope of my invention is defined in the appended claims.

I claim:

1. In combination, a piston, a cylinder slidably receiving the piston, an axially extending boss on the end of the piston, the boss having a cylindrical surface adjacent the end of the piston, and the end of the piston at the cylindrical surface of the boss forming a shoulder, an O-ring packing of resilient material engaging the cylindrical surface of the boss, the piston shoulder and the inner surface of the cylinder upon movement of the piston in one direction, said boss curving to a reduced diameter at its end remote from the piston so that upon movement of the piston in the opposite direction the O-ring moves to a position to clear the piston, the cylinder, and the boss and the O-ring being constructed for compressing the O-ring radially only when adjacent the piston shoulder, and means for preventing movement of the O-ring completely off the boss.

2. A master cylinder for brakes and the like comprising a working cylinder, a piston slidably received in the cylinder, a storage cylinder in axial alignment with and connected to the working cylinder, said storage cylinder being larger in diameter than the working cylinder, a piston rod extending through the end of the storage cylinder remote from the working cylinder, and connected to the piston, spring means for returning the piston to the storage cylinder end of the working cylinder, an O-ring of resilient material, a support on the piston for the O-ring, said O-ring being adapted to seal between the piston and working cylinder upon the pressure stroke movement of the piston, said support allowing the O-ring to roll to a non-sealing position upon the return movement of the piston, means adapted to engage with and move the O-ring to non-sealing position near the end of its return stroke should it have not previously moved thereto, and means for locking the piston rod to the storage cylinder after the pressure stroke.

3. A master cylinder for brakes and the like comprising a working cylinder, a piston slidably received in the cylinder, a storage cylinder in axial alignment with and connected to the working cylinder, said storage cylinder being larger in diameter than the working cylinder, a piston rod extending through the end of the storage cylinder remote from the working cylinder, and connected to the piston, spring means for returning the piston to the storage cylinder end of the working cylinder, an O-ring of resilient material, a support on the piston for the O-ring, said O-ring being adapted to seal between the piston and working cylinder upon the pressure stroke movement of the piston, said support allowing the O-ring to roll to a non-sealing position upon the return movement of the piston, and means adapted to engage with and move the O-ring to non-sealing position near the end of its return stroke should it have not previously moved thereto.

4. A master cylinder for brakes and the like comprising a working cylinder, a piston slidably received in the cylinder, an O-ring of resilient material, a support on the piston for the O-ring, said O-ring being adapted to seal between the piston and working cylinder upon the pressure stroke movement of the piston, said support allowing the O-ring to roll to a non-sealing position upon the return movement of the piston, and means adapted to engage with and move the O-ring to non-sealing position near the end of its return stroke should it have not previously moved thereto.

5. A master cylinder for brakes and the like comprising a working cylinder, a piston slidably received in the cylinder, a storage cylinder in axial alignment with and connected to the working cylinder, said storage cylinder being larger in diameter than the working cylinder, a piston rod extending through the end of the storage cylinder remote from the working cylinder, and connected to the piston, spring means for returning the piston to the storage cylinder end of the working cylinder, an O-ring of resilient material, a support on the piston for the O-ring, said O-ring being adapted to seal between the piston and working cylinder upon the pressure stroke movement of the piston, and means adapted to engage with and move the O-ring to non-sealing position near the end of its return stroke should it have not previously moved thereto.

6. A master cylinder as in claim 4 wherein said means comprises a push rod slidably carried by said piston and adapted to abut against a portion of the master cylinder near the end of the return stroke of said piston and force said O-ring to move axially of said support to a non-sealing position if not previously moved from its sealing position thereon.

RAYMOND H. VOGEL.

REFERENCES CITED

The following references are of record in the file of this patent:

UNITED STATES PATENTS

| Number | Name | Date |
|---|---|---|
| 478,089 | Collins | July 5, 1892 |
| 1,254,024 | Bryan | Jan. 22, 1918 |
| 2,018,325 | Schnell | Oct. 22, 1935 |
| 2,120,073 | Majneri | June 7, 1938 |
| 2,229,519 | Pate | Jan. 21, 1941 |
| 2,352,920 | Stevens | July 4, 1944 |
| 2,404,547 | Strid | July 23, 1946 |